No. 708,700. Patented Sept. 9, 1902.
C. V. DYER & W. S. WILLETTE.
INSECT DESTROYING MACHINE.
(Application filed Jan. 24, 1902.)

(No Model.) 2 Sheets—Sheet 1.

WITNESSES:
O. E. Murray.
F. A. Barton.

INVENTORS
Charles V. Dyer and Will S. Willette
BY
Milo B. Stevens & Co.
ATTORNEYS.

No. 708,700. Patented Sept. 9, 1902.
C. V. DYER & W. S. WILLETTE.
INSECT DESTROYING MACHINE.
(Application filed Jan. 24, 1902.)

(No Model.) 2 Sheets—Sheet 2.

WITNESSES:
O. E. Murray
F. W. Barron

INVENTORS
Charles V. Dyer and Will S. Willette
BY
Milo B. Stevens & Co.
ATTORNEYS.

UNITED STATES PATENT OFFICE.

CHARLES V. DYER AND WILL S. WILLETTE, OF CONROE, TEXAS.

INSECT-DESTROYING MACHINE.

SPECIFICATION forming part of Letters Patent No. 708,700, dated September 9, 1902.

Application filed January 24, 1902. Serial No. 91,056. (No model.)

*To all whom it may concern:*

Be it known that we, CHARLES V. DYER and WILL S. WILLETTE, citizens of the United States, residing at Conroe, in the county of Montgomery and State of Texas, have invented certain new and useful Improvements in Insect-Destroying Machines; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to insect-destroying machines for agricultural purposes, and particularly to such a machine having in combination a cultivator or plow.

The object of the invention is to construct an improved machine of the character described to collect insects from plants and destroy the same, and particularly to collect and destroy the boll-weevil of cotton plants.

A further object is to combine in such a machine horizontal and vertical rotating brushes coöperating to sweep the insects from the same row of plants.

A further object is to combine such a machine with a cultivator, so that the work of both may be done at the same time.

A further object is to so construct such a machine that it may be attached to and used with a riding-cultivator and also may be used alone detached.

With these and other objects in view the invention is hereinafter described, and is illustrated in the accompanying drawings, in which—

Figure 1:
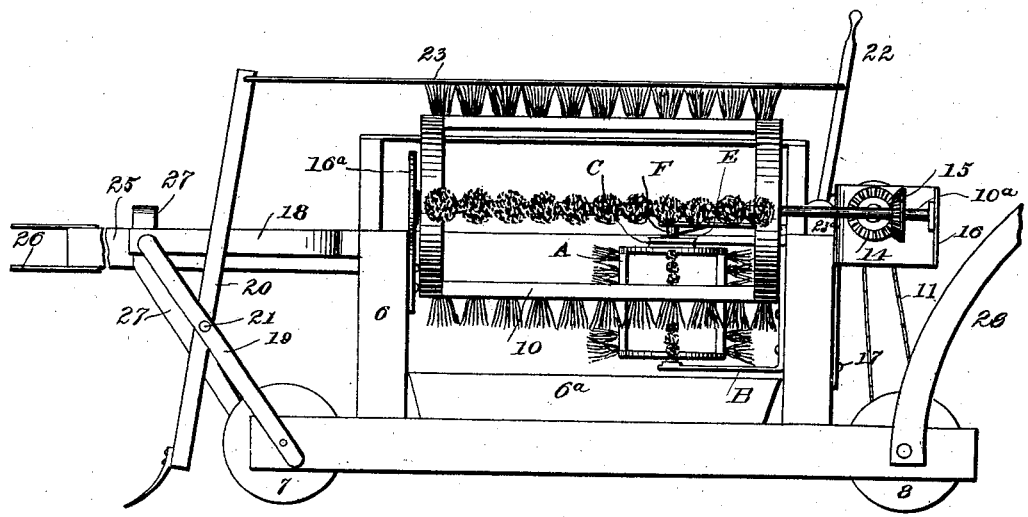
Figure 2:
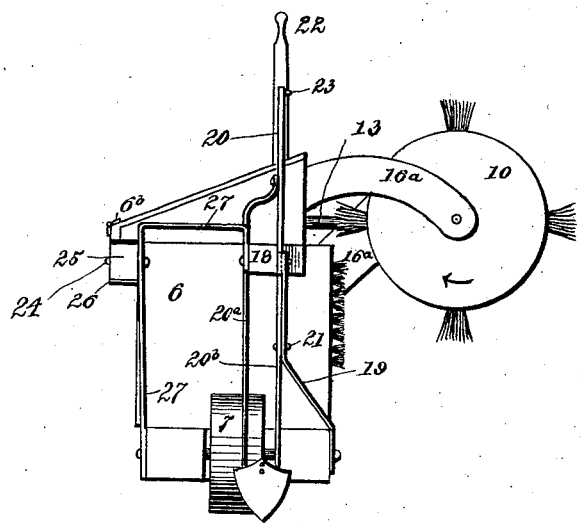
Figure 3:
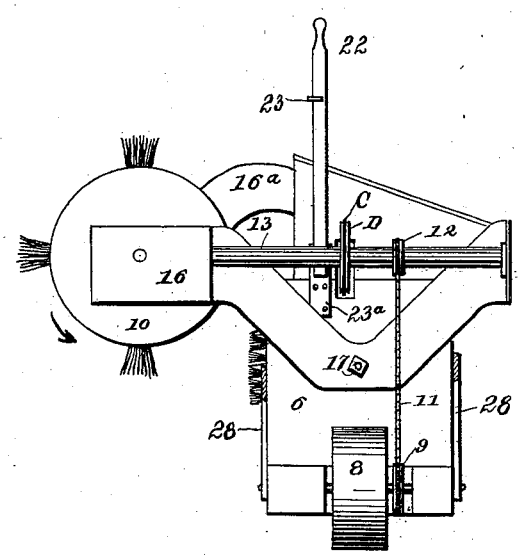
Figure 4:
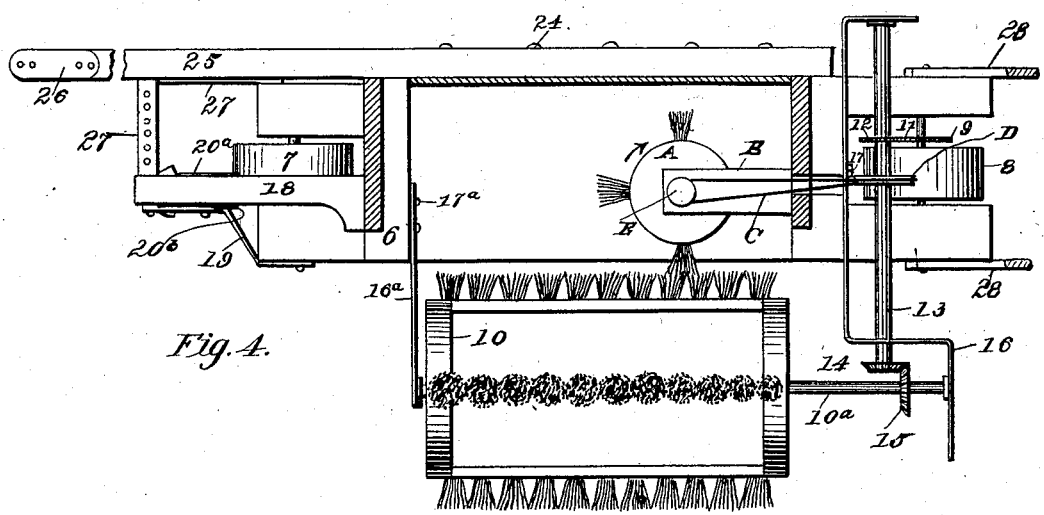

Figure 1 is a side elevation of the machine. Fig. 2 is a front elevation thereof. Fig. 3 is a rear elevation thereof. Fig. 4 is a top view thereof, parts being broken away.

Referring specifically to the drawings, 6 indicates the box-like casing or frame of the machine, supported low to the ground upon front and rear wheels 7 and 8, respectively. The rear wheel is the driving-wheel, and the shaft thereof carries a sprocket 9, which drives the rotatable horizontal brush 10 by means of chain 11, sprocket 12, and bevel-gear 14, which are fixed to the shaft 13, and bevel-gear 15, fixed to the shaft $10^a$ of the brush. The shaft 13 and the rear end of the shaft $10^a$ are supported by and rotate in suitable bearings in a bracket 16, which is bolted, as at 17, to the rear end of the casing. The bearing for the front end of the shaft $10^a$ is formed in a bracket $16^a$, which is bolted, as at $17^a$, to the front end of the casing. This construction permits variation of the height of the brush. By loosening the nuts of the bolts 17 and $17^a$ the brackets may be turned thereon as a pivot to adjust the height of the brush to suit the growth of the plants to be operated on. The gears remain in mesh because the shaft 13 takes the movement of the bracket. The vertical brush A is somewhat smaller in size than the horizontal brush and is located within the box or casing. It is carried by the shaft F, which is mounted in bearings formed in a bracket B, bolted or otherwise secured to the rear end of the casing and, is driven by a round belt C, quartered around a grooved pulley D on the shaft 13 and grooved pulley E on the shaft F. The lower end of the vertical brush is just above the edge of the pan $6^a$ in the casing. The brushes are so located that the plants to be brushed pass between them and are swept by both, and the vertical brush is so rotated as to sweep the plants by a forward movement, and the combined action of both brushes thoroughly rids the plants of the insects. The side of the casing adjacent the brushes is open to allow the latter to sweep the insects into a pan $6^a$, removably carried in the bottom of the casing. Kerosene or other suitable substance may be placed in the pan to kill the insects. The top of the casing is hinged, as at $6^b$, to conveniently permit access to the interior thereof.

From the front end of the casing a beam 18 projects, and it is supported by an inclined brace 19, extending from and fixed to the outer end of the beam and the bottom of the casing. A standard 20 is pivoted to this brace, as at 21, and carries at its lower end any proper cultivator or plow blade. The standard is preferably formed of two bars $20^a$ and $20^b$, suitably spaced apart and which span or inclose between them the beam 18. The inner faces of the bars bear against the sides of the beam. This assists in supporting the standard particularly against lateral movement. The standard may be turned upon its pivot to throw the cultivator or plow out of the ground by means of a hand-lever 22, fulcrumed to a bracket 23ª, firmly bolted to the casing. The lever is connected to the top of the standard by a rod 23. Suitable movement of the lever will raise or lower the plow, and when the plow is lowered the lever abuts against the top of the casing to assist in sustaining the thrust upon the plow.

To the side of the casing opposite the brushes is detachably secured in any proper manner, as by bolts 24, a draft-beam 25, the front end of which extends beyond that of the beam 18 and which is provided with a suitable clevis 26, whereby it may be attached to a riding-cultivator. The upper end of a clevis-frame 27 is bolted to the outer end of the beam 18 and extends thence laterally to contact with the beam 25, to which it may be attached by a removable bolt, and thence inclined downwardly to the bottom of the casing, to which it is secured as a brace. A draft-animal is attached to this clevis-frame when the machine is used alone, in which case the beam 25 is removed.

When used in connection with a riding-cultivator, one of the plows on either side of the ordinary straddle-row cultivator is detached, and the machine herein described is attached in its place by means of the beam 25 and clevis 26. In this position the machine will be carried along beside the row of plants, and the insects will be swept from the plants into the casing. The cultivator-plow carried by the machine herein described will take the place and do the work of the plow which was detached from the riding-cultivator. When the machine is detached and is to be worked by itself, the beam 25 is taken off to lighten the machine and to avoid interference with the animal, which may then be attached at the clevis-frame 27. Suitable handles 28 are secured at the rear end of the machine to manipulate and guide the same.

Having thus described the invention, what we claim as new, and desire to secure by Letters Patent, is—

1. In a machine of the character described, in combination, a casing, a rotatable brush adjustably supported adjacent thereto, means to drive the brush, normal draft appliances, and a supplementary detachable draft-beam connected to the casing.

2. In a combined insect-destroyer and cultivator, a plow-supporting frame, in combination with an insect-receiving casing and coöperating horizontal and vertical rotatable brushes adjacent to the casing.

3. In a machine of the character described, in combination, a wheeled casing, rotatable coöperative brushes secured adjacent thereto, the axes of the brushes being at an angle to each other, and means to drive the brushes.

4. In a machine of the character described, in combination, a movable casing open at one side, horizontal and vertical rotatable brushes at the open side of the casing, coöperating to sweep the same plant, and means to drive the brushes.

5. In a combined insect-destroyer and cultivator, the combination with a plow-supporting frame, of an insect-receptacle carried thereby, and coöperating horizontal and vertical rotatable brushes beside the receptacle, the horizontal brush being vertically adjustable.

In testimony whereof we affix our signatures in presence of two witnesses.

CHAS. V. DYER.
WILL S. WILLETTE.

Witnesses:
N. M. CONROE,
C. T. DARBY.